(12) United States Patent
Oprea

(10) Patent No.: US 9,965,429 B2
(45) Date of Patent: May 8, 2018

(54) METHOD AND APPARATUS TO MANAGE THE DIRECT INTERCONNECT SWITCH WIRING AND GROWTH IN COMPUTER NETWORKS

(71) Applicant: Dan Oprea, Kanata (CA)

(72) Inventor: Dan Oprea, Kanata (CA)

(73) Assignee: ROCKPORT NETWORKS INC., Ottawa ON (CA)

( * ) Notice: Subject to any disclaimer, the term of this patent is extended or adjusted under 35 U.S.C. 154(b) by 0 days. days.

(21) Appl. No.: 14/915,336

(22) PCT Filed: Aug. 29, 2014

(86) PCT No.: PCT/CA2014/000652
§ 371 (c)(1),
(2) Date: Feb. 29, 2016

(87) PCT Pub. No.: WO2015/027320
PCT Pub. Date: Mar. 5, 2015

(65) Prior Publication Data
US 2016/0210261 A1 Jul. 21, 2016

Related U.S. Application Data

(60) Provisional application No. 61/871,721, filed on Aug. 29, 2013.

(51) Int. Cl.
*G06F 13/40* (2006.01)
*G06F 13/42* (2006.01)
*H04Q 1/02* (2006.01)

(52) U.S. Cl.
CPC ...... *G06F 13/4068* (2013.01); *G06F 13/4282* (2013.01); *H04Q 1/13* (2013.01); *G06F 2213/0026* (2013.01)

(58) Field of Classification Search
None
See application file for complete search history.

(56) References Cited

U.S. PATENT DOCUMENTS 5,588,152 A * 12/1996 Dapp ............... G06F 7/483
712/16
5,590,345 A * 12/1996 Barker ............. G06F 7/483
712/11

(Continued)

OTHER PUBLICATIONS

'How to use FPGAs to develop an intelligent solar tracking system' by Altera Technical Staff—Sep. 24, 2008.*

(Continued)

*Primary Examiner* — Steven Snyder
(74) *Attorney, Agent, or Firm* — Smith Tempel Blaha LLC; Gregory Scott Smith

(57) ABSTRACT

The present invention provides a method for managing the wiring and growth of a direct interconnect network implemented on a torus or higher radix interconnect structure based on an architecture that replaces the Network Interface Card (NIC) with PCIe switching cards housed in the server. Also provided is a passive patch panel for use in the implementation of the interconnect, comprising: a passive backplane that houses node to node connectivity for the interconnect; and at least one connector board plugged into the passive backplane comprising multiple connectors. The multiple connectors are capable of receiving an interconnecting plug to maintain the continuity of the torus or higher radix topology when not fully enabled. The PCIe card for use in the implementation of the interconnect comprises: at least 4 electrical or optical ports for the interconnect; a local switch; a processor with RAM and ROM memory; and a PCI interface.

9 Claims, 16 Drawing Sheets

(56) References Cited

U.S. PATENT DOCUMENTS

| | | | |
|---|---|---|---|
| 6,421,251 B1* | 7/2002 | Lin | G06F 17/5022 361/788 |
| 7,301,780 B2* | 11/2007 | AbuGhazaleh | H05K 1/0228 361/780 |
| 7,440,448 B1* | 10/2008 | Lu | H04L 1/22 370/380 |
| 7,822,958 B1* | 10/2010 | Allen | G06F 9/4401 326/41 |
| 7,929,522 B1* | 4/2011 | Lu | H04L 1/22 370/388 |
| 8,391,282 B1* | 3/2013 | Lu | H04L 1/22 370/248 |
| 8,851,902 B2* | 10/2014 | Shifris | H01R 13/6658 439/65 |
| 8,994,547 B2* | 3/2015 | German | H04Q 1/136 340/10.1 |
| 9,026,486 B2* | 5/2015 | Doorhy | H04L 41/0806 706/50 |
| 9,332,323 B2* | 5/2016 | Zhang | H04Q 11/0005 |
| 9,581,636 B2* | 2/2017 | Yossef | H04L 43/00 |
| 9,609,782 B2* | 3/2017 | Faw | G06F 1/183 |
| 2004/0141285 A1 | 7/2004 | Lefebvre et al. | |
| 2008/0212273 A1 | 9/2008 | Bechtolsheim | |
| 2010/0098425 A1* | 4/2010 | Kewitsch | G02B 6/3895 398/116 |
| 2010/0176962 A1* | 7/2010 | Yossef | H04L 43/00 340/815.45 |
| 2012/0134678 A1* | 5/2012 | Roesner | G06F 13/14 398/115 |
| 2013/0209100 A1* | 8/2013 | Drury | H04J 14/02 398/48 |
| 2013/0266315 A1* | 10/2013 | Drury | H04J 14/0254 398/48 |
| 2013/0271904 A1* | 10/2013 | Hormuth | H05K 7/1492 361/679.02 |
| 2013/0275703 A1* | 10/2013 | Schenfeld | G06F 12/0292 711/165 |
| 2014/0098702 A1* | 4/2014 | Fricker | H04L 12/28 370/254 |
| 2014/0119728 A1* | 5/2014 | Zhang | H04J 14/0204 398/48 |
| 2014/0141643 A1* | 5/2014 | Panella | H04Q 1/13 439/391 |
| 2014/0184238 A1* | 7/2014 | Yossef | H04L 43/00 324/538 |
| 2014/0258200 A1* | 9/2014 | Doorhy | H04L 41/0806 706/45 |
| 2015/0254201 A1* | 9/2015 | Billi | G06F 13/4022 710/316 |
| 2015/0334867 A1* | 11/2015 | Faw | G06F 1/183 211/126.1 |
| 2017/0102510 A1* | 4/2017 | Faw | G02B 6/4452 |

OTHER PUBLICATIONS

'Sun Fire T2000 Server Administration Guide' Chapter 1, copyright 2007, Sun Microsystems, Inc.*

'An All-Optical PCI-Express Network Interface for Optical Packet Switched Networks' by Liboiron-Ladouceur et al., from the Conference on Optical Fiber Communication and the National Fiber Optic Engineers Conference, 2007.*

'A Survey on Optical Interconnects for Data Centers' by Christoforos Kachris and Ioannis Tomkos, IEEE Communications Surveys & Tutorials, vol. 14, No. 4, Fourth Quarter 2012.*

Scalable Interconnect for a booster with Knights Corner processors, U. Bruening, The European Way to Exascale: DEEP at ISC BoF, Jun. 20, 2012, ISC Hamburg. Retrieved from Internet: http://www.deep-project.eu/SharedDocs/Downloads/DEEP-PROJECT/EN/Presentations/ISC12-BoF-Extoll.pdf?_blob=publicationFile.

APEnet+: a 3D Torus network optimized for GPU-based HPC Systems, R Ammendola et al, International COnference on Computing in High Energy and Nuclear Physics 2012 (CHEP2012), Journal of Physics: Conference Series 396 (2012). Retrieved from Internet: http://iopscience.iop.org/article/10.1088/1742-6596/396/4/042059/pdf.

APEnet+: High bandwidth 3D tons direct network for petaflops scale commodity clusters, R. Ammendola et al, proceeding of CHEP 2010, Taiwan, Oct. 18-22, Journal of Physics: Conference Series 331 (2011), Feb. 2011. Retrieved from Internet: http://arxiv.org/pdf/1102.3796.pdf.

Advanced Technologies of the Supercomputer PRIMEHPCFX10, Next Generation Technical Computing Unit, Fujitsu Limited, Nov. 7, 2011.

IBM System Blue Gene Solutions: Blue Gene/Q Hardware Overview and Installation Planning, International Business Machines, IBM, May 13, 2013, ISBN 0738438227.

* cited by examiner

PRIOR ART

PRIOR ART

```
int main (int argc, char* argv[])
{ std::pair<int,int> rstart, pstart;
    pstart.first=0;
    static const int xDim=6;
    static const int yDim=7;
    static const int zDim=6;
    static const int aDim=7;

std::cout << "// Patch: incrFolded - Xrings!!!\n";
    pstart.first=0;
    for (int a=0; a < aDim; a++) {
        pstart.second=0;
        for (int z=0; z < zDim; z++) {
            rstart.first=0;
            for (int y = 0; y < yDim; ++y) {
                mkRing(pstart, rstart, aDim, zDim, yDim, xDim, ringX);
                rstart.first++;}
            pstart.second++;}
        pstart.first++;}
    std::cout << "// Patch: incrFolded - Yrings!!!\n";
    pstart.first=0;
    for (int a=0; a < aDim; a++) {
        pstart.second=0;
        for (int z=0; z < zDim; z++) {
            rstart.second=0;
            for (int x = 0; x < xDim; ++x) {
                mkRing(pstart, rstart, aDim, zDim, yDim, xDim, ringY);
                rstart.second++;}
            pstart.second++;}
        pstart.first++;}
    std::cout << "// Patch: incrFolded - Zrings!!!\n";
    pstart.first=0;
    for (int a=0; a < aDim; a++) {
        rstart.first=0;
        for (int y=0; y < yDim; y++) {
            rstart.second=0;
            for (int x = 0; x < xDim; ++x) {
                mkRing(pstart, rstart, aDim, zDim, yDim, xDim, ringZ);
                rstart.second++;}
            rstart.first++;}
        pstart.first++;}
    std::cout << "// Patch: incrFolded - Arings!!!\n";
    pstart.second=0;
    for (int z=0; z < zDim; z++) {
        rstart.first=0;
        for (int y=0; y < yDim; y++) {
            rstart.second=0;
            for (int x = 0; x < xDim; ++x) {
                mkRing(pstart, rstart, aDim, zDim, yDim, xDim, ringA);
                rstart.second++;}
            rstart.first++;}
        pstart.second++;}}
```

FIGURE 20a

```
enum Ringtype {ringA,ringZ,ringY,ringX};
std::pair<int,int> swapPair (std::pair<int,int>p)
{return std::pair<int,int> (p.second, p.first);}
std::pair<int,int> incrFolded(std::pair<int,int> cur, int rowDim, int colDim)
{std::pair <int, int> res(cur);
    if (colDim >1) {int nextCol;
        if (cur.second &1) {nextCol=cur.second -2;
            if (nextCol <0) nextCol=0;} else {nextCol = cur.second+2;
            if (nextCol >=colDim) nextCol = 2*colDim-1-nextCol;}
    res.second = nextCol;} else if (colDim > 0) {res.second += (cur.second &1)?-1:1;}
    return res;} void mkRing (std::pair<int,int> & ppair, std::pair<int,int> & rpair, int dimA, int dimZ, int dimY, int dimX, Ringtype rt)
{
    std::pair<int,int> pstart=ppair, rstart=rpair;
    switch (rt) {
        case ringX:
        {if (dimX > 1) {
            std::string sstart= "\", 0";
            std::string sres  = "\", 1";
            rstart.second=0;
            for (int i=0; i< dimX; i++){
                std::pair<int,int> res = incrFolded(rstart, dimY, dimX);
                std::pair<int,int> pres = pstart;
                std::cout << " {\"" << pstart.first << "," << pstart.second << "," << rstart.first << ","
<<rstart.second << sstart <<", \"" << pres.first << "," << pres.second << "," << res.first << ","
<<res.second << sres << "},\n";
                rstart=rres;}}
        break;
        case ringY:
        {if (dimY > 1) {
            std::string sstart= "\", 2";
            std::string sres  = "\", 3";
            rstart.first=0;
            for (int i=0; i< dimY; i++){
                std::pair<int,int>res=
```

FIGURE 20b

```
swapPair(incrFolded(swapPair(rstart), dimX, dimY));
        std::pair<int,int> pres = pstart;
        std::cout << " {\"" << pstart.first << "," << pstart.second << "," << rstart.first
<< "," <<rstart.second << sstart << ", \"" << pres.first << "," << pres.second << "," <<
res.first << "," << res.second << sres << "},\n";
        rstart=res;}}
    break;
    case ringZ:
    {if (dimZ > 1) {
        std::string sstart= "\"", 4";
        std::string sres  = "\"", 5";
        pstart.second=0;
        for (int i=0; i< dimZ; i++){
            std::pair<int,int> res = rstart;
            std::pair<int,int> pres = incrFolded(pstart, dimA, dimZ);
            std::cout << " {\"" << pstart.first << "," << pstart.second << "," << rstart.first
<< "," <<rstart.second << sstart << ", \"" << pres.first << "," << pres.second << "," <<
res.first << "," << res.second << sres << "},\n";
            rstart=res;
            pstart=pres;}}
    break;
    case ringA:
    {if (dimA > 1) {
        std::string sstart= "\"", 6";
        std::string sres  = "\"", 7";
        pstart.first=0;
        for (int i=0; i< dimA; i++){
            std::pair<int,int> res = rstart;
            std::pair<int,int> pres = swapPair(incrFolded(swapPair(pstart), dimZ, dimA));
            std::cout << " {\"" << pstart.first << "," << pstart.second << "," << rstart.first
<< "," <<rstart.second << sstart << ", \"" << pres.first << "," << pres.second << "," <<
res.first << "," << res.second << sres << "},\n";
            rstart=res;
            pstart=pres;}}
    break;}}
```

FIGURE 20c

METHOD AND APPARATUS TO MANAGE THE DIRECT INTERCONNECT SWITCH WIRING AND GROWTH IN COMPUTER NETWORKS

FIELD OF THE INVENTION

The present invention relates to computer network topology and architecture. In particular, the present invention relates to a method and apparatus for managing the wiring and growth of a direct interconnect switch implemented on, for example, a torus or higher radix wiring structure.

BACKGROUND OF THE INVENTION

The term Data Centers (DC) generally refers to facilities used to house large computer systems (often contained on racks that house the equipment) and their associated components, all connected by an enormous amount of structured cabling. Cloud Data Centers (CDC) is a term used to refer to large, generally off-premise facilities that similarly store an entity's data.

Network switches are computer networking apparatus that link network devices for communication/processing purposes. In other words, a switch is a telecommunication device that is capable of receiving a message from any device connected to it, and transmitting the message to a specific device for which the message was to be relayed. A network switch is also commonly referred to as a multi-port network bridge that processes and routes data. Here, by port, we are referring to an interface (outlet for a cable or plug) between the switch and the computer/server/CPU to which it is attached.

Today, DCs and CDCs generally implement data center networking using a set of layer two switches. Layer two switches process and route data at layer 2, the data link layer, which is the protocol layer that transfers data between nodes (e.g. servers) on the same local area network or adjacent nodes in a wide area network. A key problem to solve, however, is how to build a large capacity computer network that is able to carry a very large aggregate bandwidth (hundreds of TB) containing a very large number of ports (thousands), that requires minimal structure and space (i.e. minimizing the need for a large room to house numerous cabinets with racks of cards), that is easily scalable, and that may assist in minimizing power consumption.

The traditional network topology implementation is based on totally independent switches organized in a hierarchical tree structure as shown in FIG. 1. Core switch 2 is a very high speed, low count port with a very large switching capacity. The second layer is implemented using Aggregation switch 4, a medium capacity switch with a larger number of ports, while the third layer is implemented using lower speed, large port count (forty/forty-eight), low capacity Edge switches 6. Typically the Edge switches are layer two, whereas the Aggregation ports are layer two and/or three, and the Core switch is typically layer three. This implementation provides any server 8 to server connectivity in a maximum of six hop links in the example provided (three hops up to the core switch 2 and three down to the destination server 8). Such a hierarchical structure is also usually duplicated for redundancy-reliability purposes. For example, with reference to FIG. 1, without duplication if the right-most Edge switch 6 fails, then there is no connectivity to the right-most servers 8. In the least, core switch 2 is duplicated since the failure of the core switch 2 would generate a total data center connectivity failure. For reasons that are apparent, this method has significant limitations in addressing the challenges of the future DC or CDC. For instance, because each switch is completely self-contained, this adds complexity, significant floor-space utilization, complex cabling and manual switches configuration/provisioning that is prone to human error, and increased energy costs.

Many attempts have been made, however, to improve switching scalability, reliability, capacity and latency in data centers. For instance, efforts have been made to implement more complex switching solutions by using a unified control plane (e.g. the QFabric System switch from Juniper Networks; see, for instance, http://www.juniper.net/us/en/products-services/switching/qfabric-system/), but such a system still uses and maintains the traditional hierarchical architecture. In addition, given the exponential increase in the number of system users and data to be stored, accessed, and processed, processing power has become the most important factor when determining the performance requirements of a computer network system. While server performance has continually improved, one server is not powerful enough to meet the needs. This is why the use of parallel processing has become of paramount importance. As a result, what was predominantly north-south traffic flows, has now primarily become east-west traffic flows, in many cases up to 80%. Despite this change in traffic flows, the network architectures haven't evolved to be optimal for this model. It is therefore still the topology of the communication network (which interconnects the computing nodes (servers)) that determines the speed of interactions between CPUs during parallel processing communication.

The need for increased east-west traffic communications led to the creation of newer, flatter network architectures, e.g. toroidal/torus networks. A torus interconnect system is a network topology for connecting network nodes (servers) in a mesh-like manner in parallel computer systems. A torus topology can have nodes arranged in 2, 3, or more (N) dimensions that can be visualized as an array wherein processors/servers are connected to their nearest neighbor processors/servers, and wherein processors/servers on opposite edges of the array are connected. In this way, each node has 2N connections in a N-dimensional torus configuration (FIG. 2 provides an example of a 3-D torus interconnect). Because each node in a torus topology is connected to adjacent ones via short cabling, there is low network latency during parallel processing. Indeed, a torus topology provides access to any node (server) with a minimum number of hops. For example, a four dimension torus implementing a 3×3×3×4 structure (108 nodes) requires on average 2.5 hops in order to provide any to any connectivity. Unfortunately, large torus network implementations have not been practical for commercial deployment in DCs or CDCs because large implementations can take years to build, cabling can be complex (2N connections for each node), and they can be costly and cumbersome to modify if expansion is necessary. However, where the need for processing power has outweighed the commercial drawbacks, the implementation of torus topologies in supercomputers has been very successful. In this respect, IBM's Blue Gene supercomputer provides an example of a 3-D torus interconnect network wherein 64 cabinets house 65,536 nodes (131,072 CPUs) to provide petaFLOPs processing power (see FIG. 3 for an illustration), while Fujitsu's PRIMEHPC FX10 supercomputer system is an example of a 6-D torus interconnect housed in 1,024 racks comprising 98,304 nodes). While the above examples dealt with a torus topology, they are equally applicable to other flat network topologies.

The present invention seeks to overcome the deficiencies in such prior art network topologies by providing a system and architecture that is beneficial and practical for commercial deployment in DCs and CDCs.

SUMMARY OF THE INVENTION

In one aspect, the present invention provides a method for managing the wiring and growth of a direct interconnect network implemented on a torus or higher radix interconnect structure, comprising: populating a passive patch panel comprising at least one connector board having multiple connectors with an interconnect plug at each of said connectors; removing an interconnect plug from a connector and replacing said plug with a connecting cable attached to a PCIe card housed in a server to add said server to the interconnect structure; discovering connectivity of the server to the interconnect structure; and discovering topology of the interconnect structure based on the servers added to the interconnect structure.

In another aspect, the present invention provides a passive patch panel for use in the implementation of a torus or higher radix interconnect, comprising: a passive backplane that houses node to node connectivity for the torus or higher radix interconnect; and at least one connector board plugged into the passive backplane comprising multiple connectors. The passive patch panel may be electrical, optical, or a hybrid of electrical and optical. The optical passive patch panel is capable of combining multiple optical wavelengths on the same fiber. Each of the multiple connectors of the at least one connector board is capable of receiving an interconnecting plug that may be electrical or optical, as appropriate, to maintain the continuity of the torus or higher radix topology.

In yet another aspect, the present invention provides a PCIe card for use in the implementation of a torus or higher radix interconnect, comprising: at least 4 electrical or optical ports for the torus or higher radix interconnect; a local switch; a processor with RAM and ROM memory; and a PCI interface. The local switch may be electrical or optical. The PCIe card is capable of supporting port to PCI traffic, hair pinning traffic, and transit with add/drop traffic. The PCIe card is further capable of combining multiple optical wavelengths on the same fiber.

BRIEF DESCRIPTION OF THE DRAWINGS

The embodiment of the invention will now be described, by way of example, with reference to the accompanying drawings in which:

FIGS. 20a to 20c displays the pseudocode to generate the netlist for the wiring of a 4D torus structure;

DETAILED DESCRIPTION OF THE INVENTION

The present invention uses a torus mesh or higher radix wiring to implement direct interconnect switching for data center applications. Such architecture is capable of providing a high performance flat layer 2/3 network to interconnect tens of thousands of servers in a single switching domain.

Figure 1:
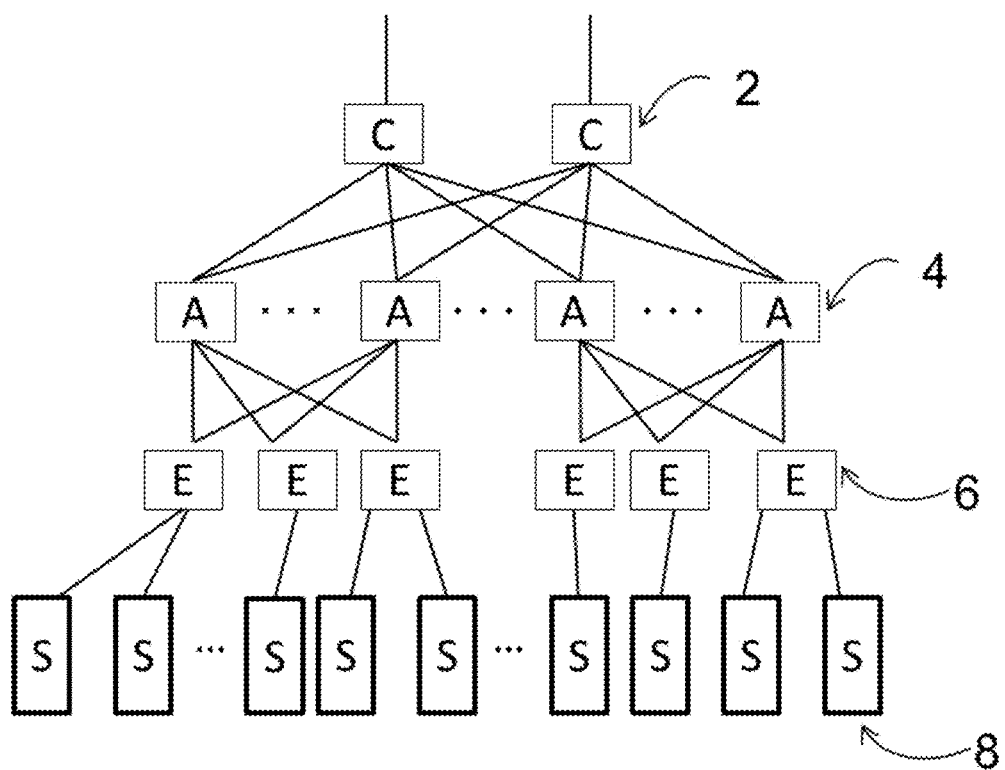
FIG. 1 displays a high level view of the traditional data center network implementation (Prior art)
Figure 2:
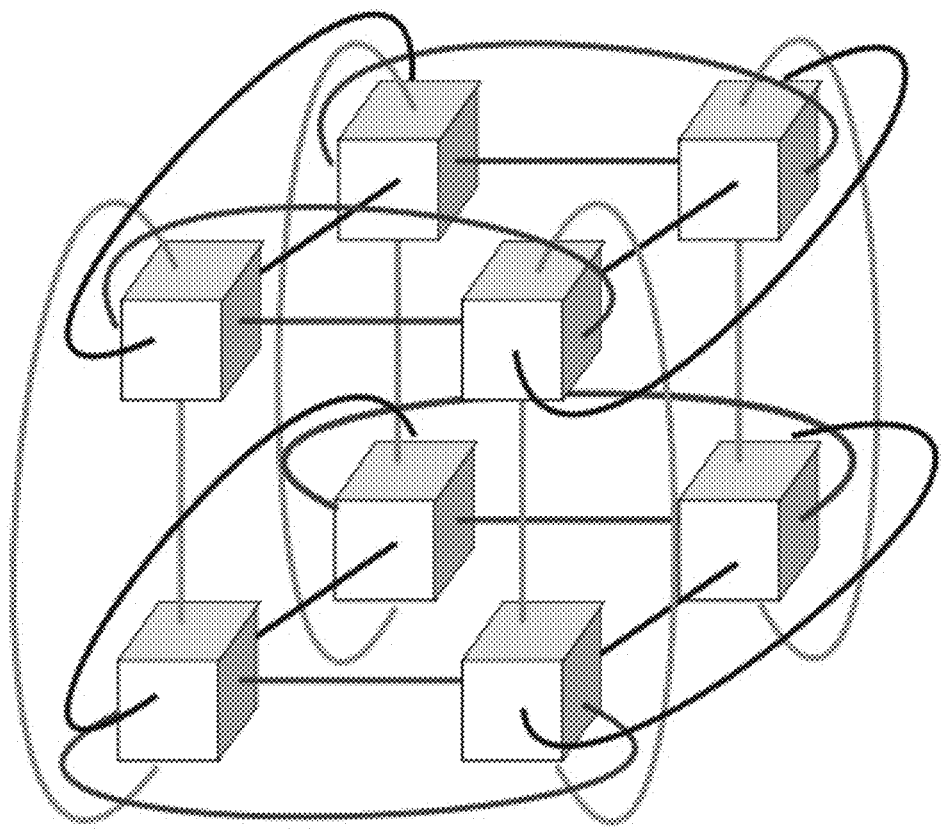
FIG. 2 displays a diagram of a 3-dimensional torus interconnect having 8 nodes (Prior Art)
Figure 3:
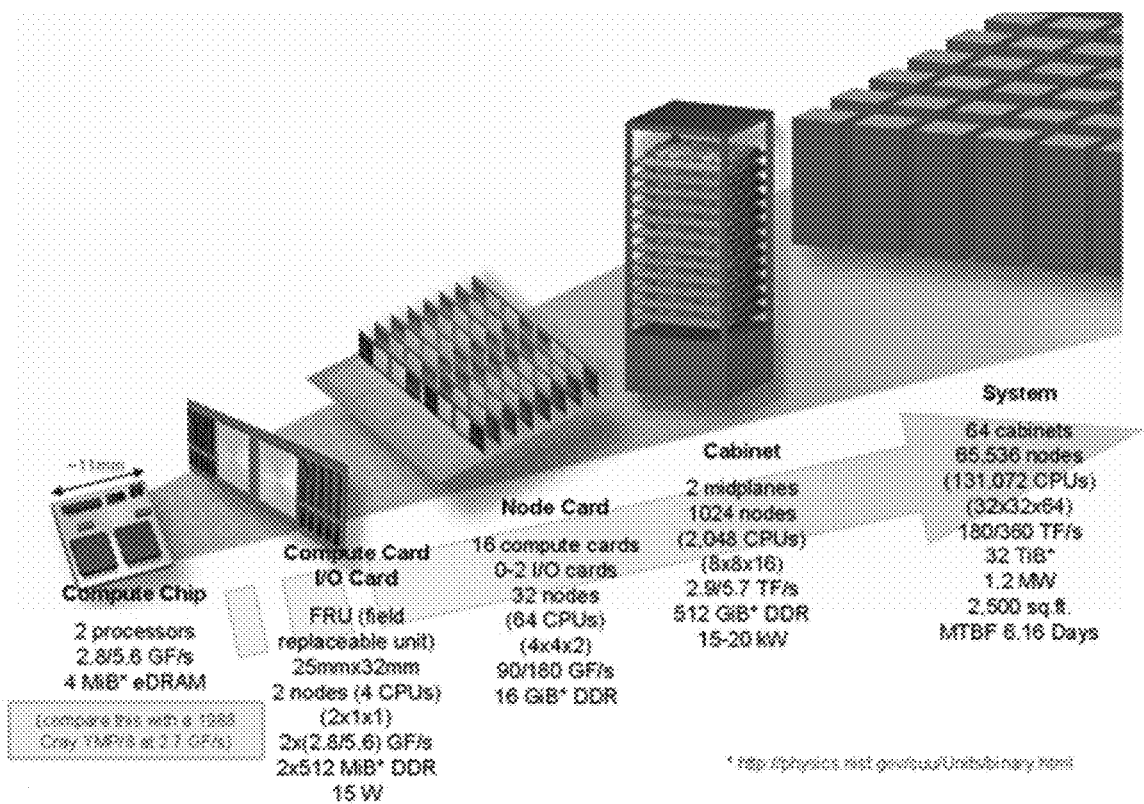
FIG. 3 displays a diagram showing the hierarchy of the IBM Blue Gene processing units employing a torus architecture (Prior Art)
Figure 4:
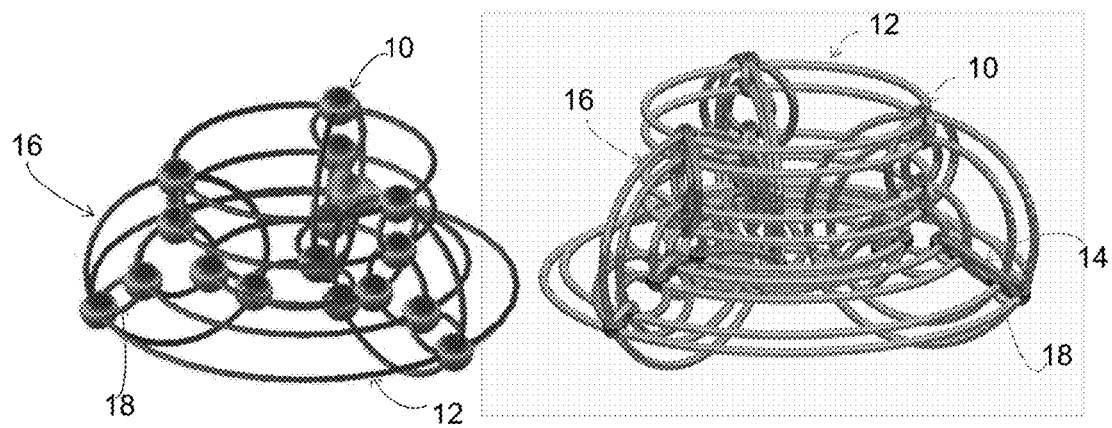
FIG. 4 displays a high level diagram of a 3D and 4D torus structure according to an embodiment of the present invention.

With reference to FIG. 4, the torus used is multidimensional (i.e. 3D, 4D, etc.), in order to promote efficiency of routing packets across the structure (although even a single dimensional torus can be used in certain deployments). In this respect, there is a minimum number of hops for any to any connectivity (e.g. a four dimension torus implementing a 3×3×3×4 structure (108 nodes) requires on average only 2.5 hops in order to provide any to any connectivity). Each node 10 (server) can be visualized as being connected on each dimension in a ring connection (12, 14, 16, and 18) because the nodes 10 (servers) are connected to their nearest neighbor nodes 10 (servers), as well as nodes 10 (servers) on opposite edges of the structure. Each node 10 thereby has 2N connections in the N-dimensional torus configuration. The ring connection itself can be implemented as an electrical interconnect or as an optical interconnect, or a combination of both electrical and optical interconnect.

One problem to be addressed in such a topology, however, is how to reduce deployment complexity by promoting wiring simplification and simplicity when adding new nodes in the network without impacting the existing implementation. This is one aspect of the present invention, and this disclosure addresses the wiring issues when implementing large torus or higher radix structures.

Figure 5:
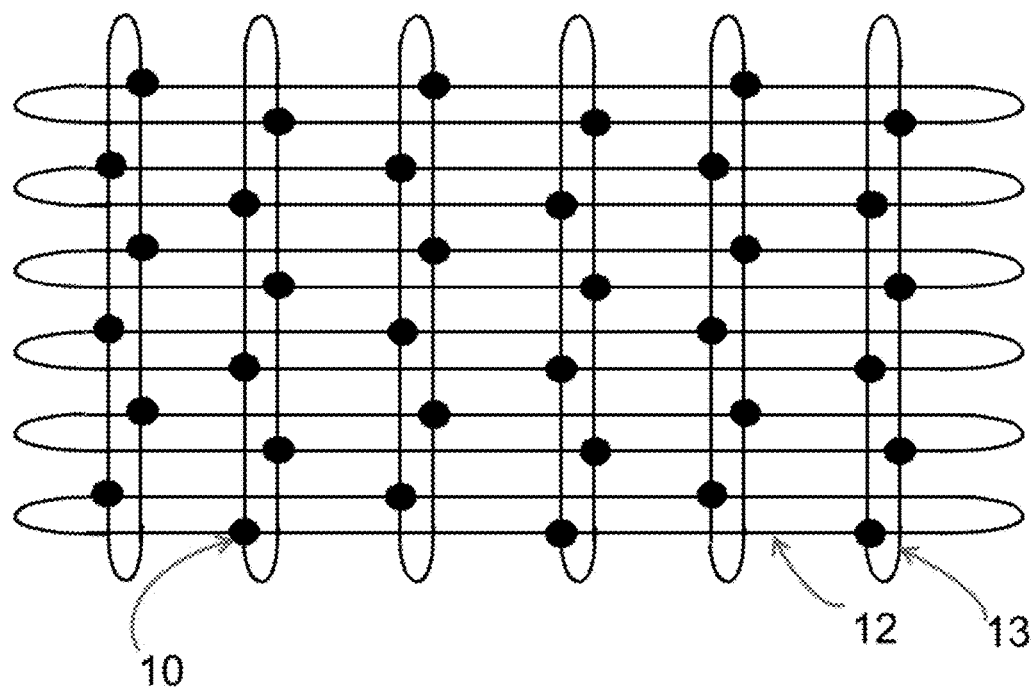
FIG. 5 displays a diagram for a 36 node 2-D torus according to an embodiment of the present invention as an easy to follow example of the network interconnect.

FIG. 5 displays a simple 2D torus wiring diagram for a 6×6 thirty-six node configuration for ease of explanation. As shown, the structure is a folded 2D torus wherein the length of each connection (12, 13) is equivalent throughout. Each node 10 in this diagram represents a server interconnected via a PCIe switch card 41 (shown in FIG. 16 for instance) that is housed in the server.

Figure 6:
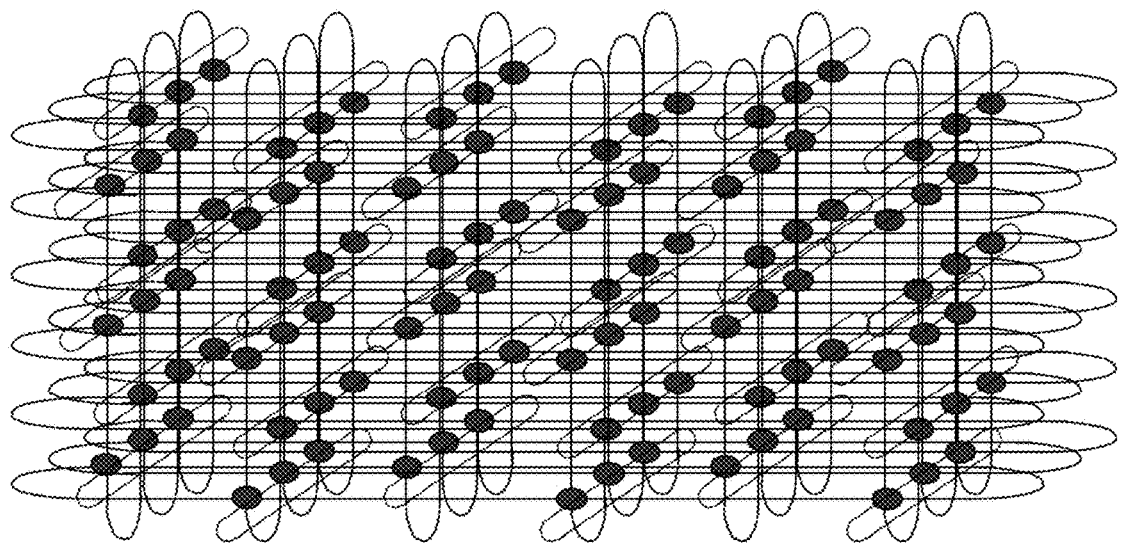
FIG. 6 displays a three dimensional configuration of the 2-D configuration shown in FIG. 5 replicated three times and interconnected on the third dimension.

FIG. 6 displays a three dimensional configuration build using the 2D configuration of FIG. 5, but replicated three times and interconnected on the third dimension.

Figure 7:
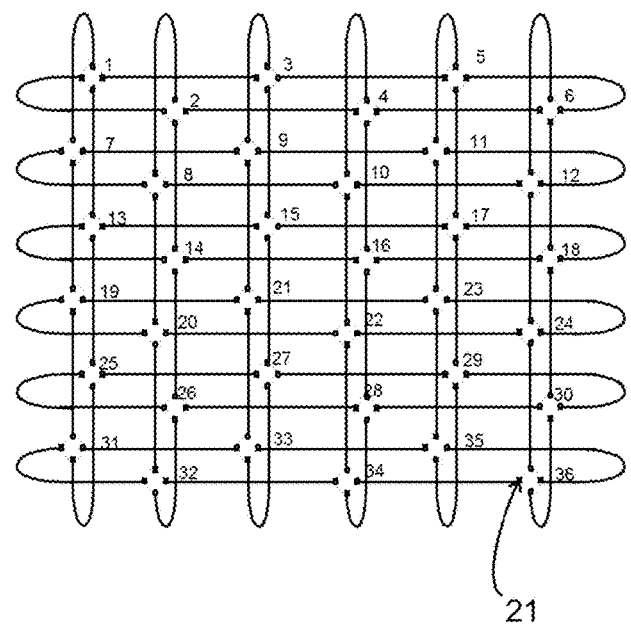
FIG. 7 displays a wiring diagram of the node connectivity for the 2-D torus shown in FIG. 5.
Figure 9:
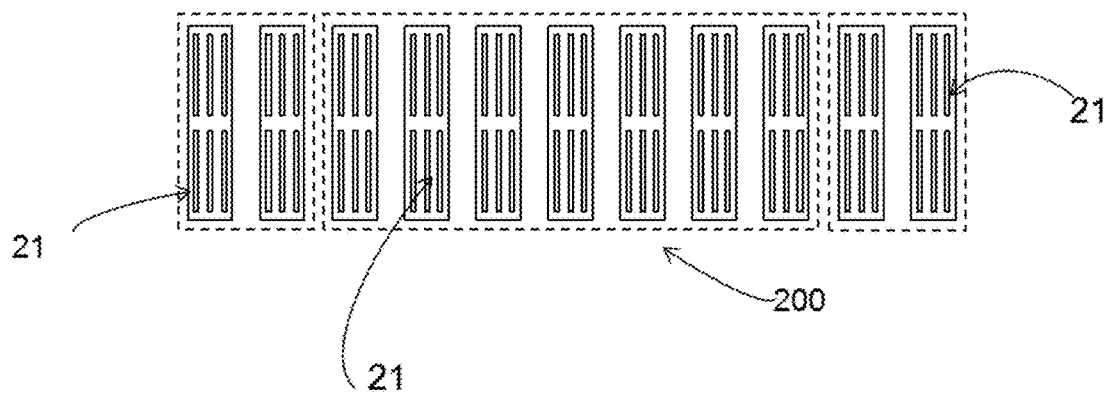
FIG. 9 displays a diagram of the passive backplane of the Top of the Rack Patch Panel (TPP) that implements the wiring for the direct interconnect network of the present invention.
Figure 10:
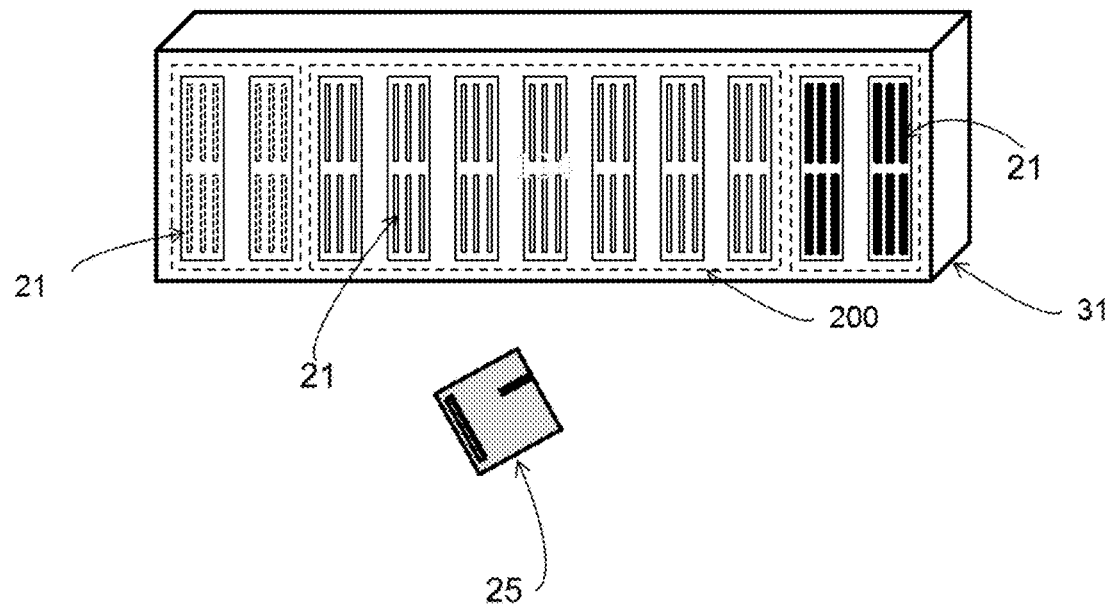
FIG. 10 displays the TPP and interconnecting plug of the present invention.
Figure 14:
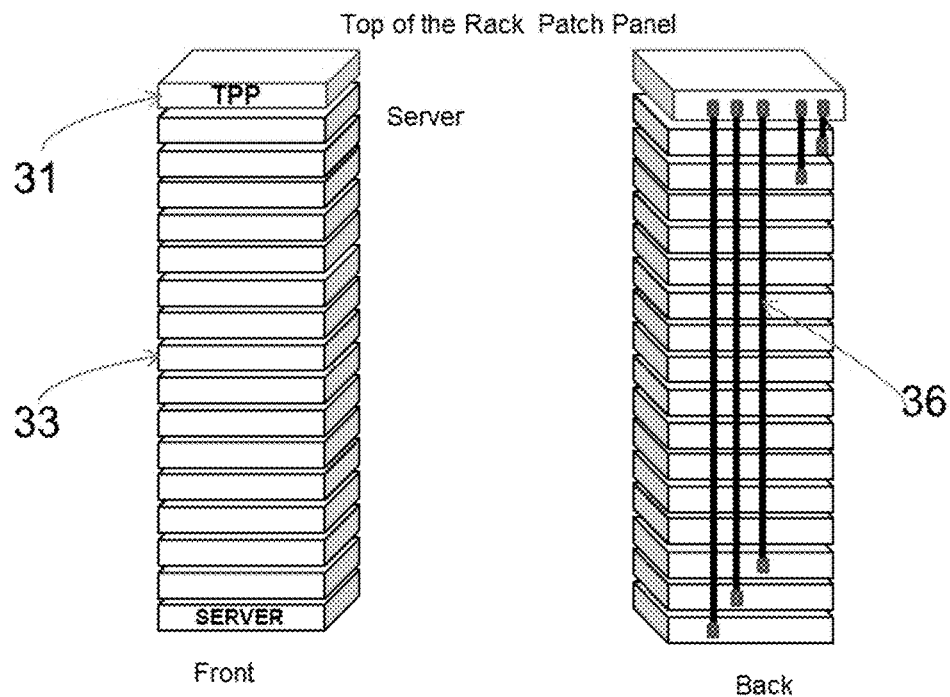
FIG. 14 displays a high level view of a data center server rack with a TPP implementation in accordance with the present invention.

FIG. 7 displays the wiring diagram for the two dimensional torus structure shown in FIG. 5. In the implementation shown, each of the 36 nodes 10 has connectors 21 (which can, for instance, be a Very High Density Cable Interconnect VHDCI connector supplied by Molex or National Instruments, etc.) with four connections (north (N), south (S), east (E), west (W)) that provide the switch wiring when the cable from the PCIe card 41 (not shown) is plugged in. In order to simplify the wiring, the connectors 21 are interconnected in a passive backplane 200 (as shown in FIG. 9) that is housed by a Top of the rack Patch Panel (TPP) 31 (as shown in FIGS. 10 and 14). The passive backplane 200 presented in FIG. 9 shows three fields: the main field (as shown in the middle of the diagram in dashed lines) populated with the 42 connectors 21 implementing a 2D 7×6 torus configuration, the field on the left (in dashed lines) populated with the 2 groups of 6 connectors 21 for expansion on the third dimension, and the field on the right (in dashed lines) with 2 groups of 6 connectors 21 to allow for expansion on the fourth dimension. The 3D expansion is implemented by connecting the 6 cables (same type as the cables connecting the PCIe card 41 to the TPP connector 21) from the TPP to the TPP on a different rack 33 of servers. The TPP patch panel backplane implementation can even be modified if desired, and with a simple printed circuit board replacement (backplane 200) a person skilled in the art can change the wiring as required to implement different torus structures (e.g. 5D, 6D, etc.). In order to provide the ability to grow the structure without any restrictions or rules to follow when adding new servers in the rack 33, a small interconnecting plug 25 may be utilized. This plug 25 can be populated at TPP manufacture for every connector 21. This way, every ring connection is initially closed and by replacing the plug 25 as needed with PCIe cable from the server the torus interconnect is built.

Figure 8:
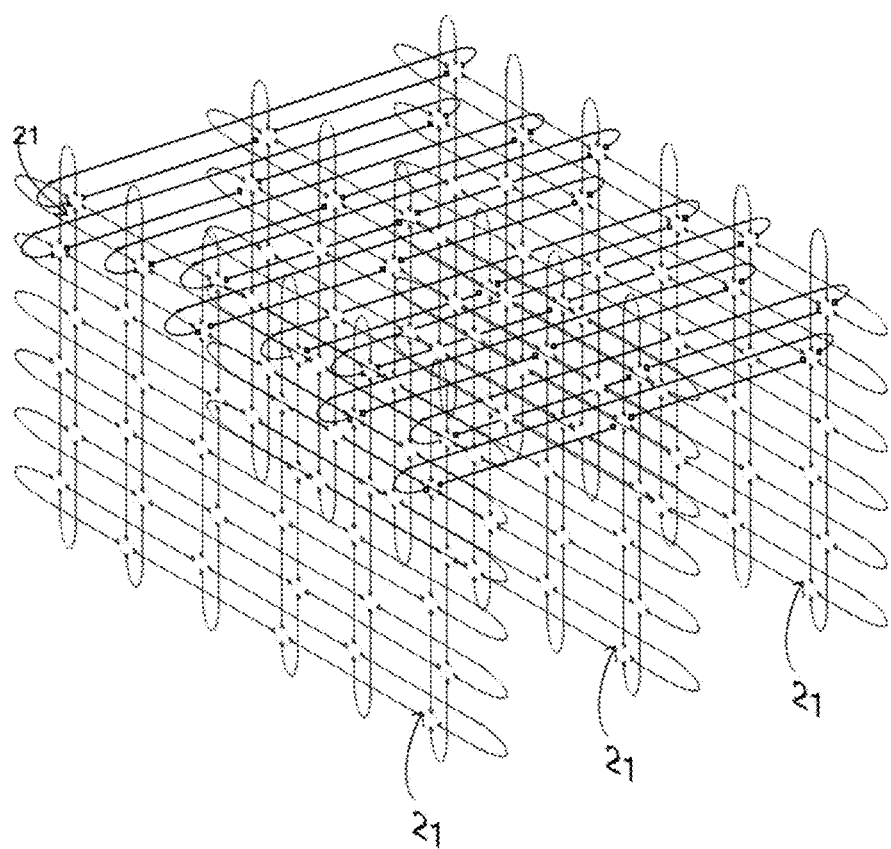
FIG. 8 displays a wiring diagram of the node connectivity for the 3-D torus shown in FIG. 6.

FIG. 8 presents the wiring diagram for a three dimensional torus structure. Note for instance the 6 connections shown at the nodes at the top left of the diagram to attach the PCIe cables to the 3D structure: +X, −X, +Y, −Y, +Z and −Z. The TPP implementation to accommodate the 3D torus cabling is designed to connect any connector 21 to every other connector 21 following the wiring diagram shown in FIG. 8.

The novel method of generating a netlist of the connectivity of the TPP is explained with the aid of pseudocode as shown at FIGS. 20a to 20c for a 4D torus wiring implementation (that can easily be modified for a 3D, 5D, etc. implementation or otherwise). For the 3D torus (Z, Y, X) each node 10 will be at the intersection of the three rings—ringZ, ringY and ringX.

If a person skilled in the art of network architecture desires to interconnect all the servers in a rack 33 (up to 42 servers; see the middle section of FIG. 9 as discussed above) at once, there are no restrictions—the servers can be wired in random fashion. This approach greatly simplifies the deployment—you add the server, connect the cable to the TPP without any special connectivity rules, and the integrity of the torus structure is maintained. The network management system that a person skilled in the art would know how to implement will maintain a complete image of the data center network including the TPP and all the interconnected servers, which provides connectivity status and all the information required for each node.

Figure 11:
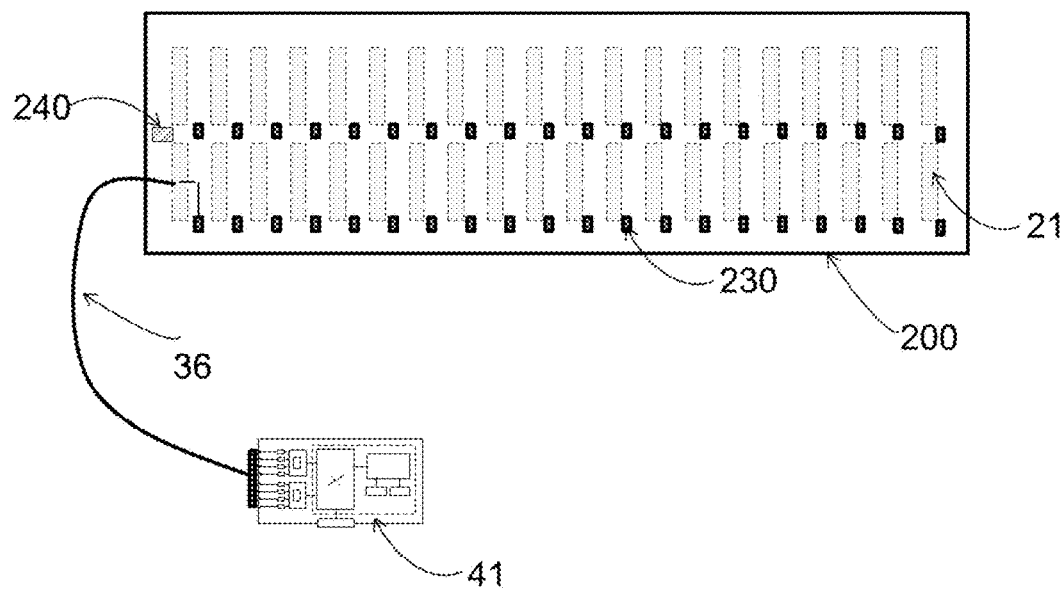
FIG. 11 displays the rear view of the passive backplane of the TPP with the unpowered integrated circuits used to identify the connector ID and the patch panel ID, and the PCIe card connected to the TPP.

As shown in FIG. 11, each PCIe card 41 (housed in a node server) has connectivity by cable 36 to the TPP. The cable 36 connecting the PCIe card 41 to the TPP provides connectivity to the 8 ports 40 (see FIG. 16) and also provides connectivity to the TPP for management purposes. The backplane 200 includes unpowered electronic devices/integrated circuit (IC) 230 attached to every connector 21. Devices 230 are interrogated by the software running on the PCIe card 41 in order to get the connector ID where it is connected. Every device 230 attached to the connector uses a passive resistor combination that uniquely identifies every connector.

The TPP identification mechanism (patch panel ID) is also implemented using the electronic device 240 which may be programmed at installation. The local persistent memory of device 240 may also hold other information—such as manufacturing date, version, configuration and ID. The connectivity of device 240 to the PCIe cards permits the transfer of this information at software request.

At the card initialization the software applies power to the IC 230 and reads the connector 21 ID. A practical implementation requires wire connectivity—two for power and ground and the third to read the connector 21 ID using "1-Wire" technology.

In a similar fashion, the patch panel ID, programmed at installation with the management software, can be read using the same wiring as with IC 230. The unpowered device 240 has non-volatile memory with the ability to support read/write transactions under software control. IC 240 may hold manufacturing information, TPP version, and TPP ID.

Figure 12:
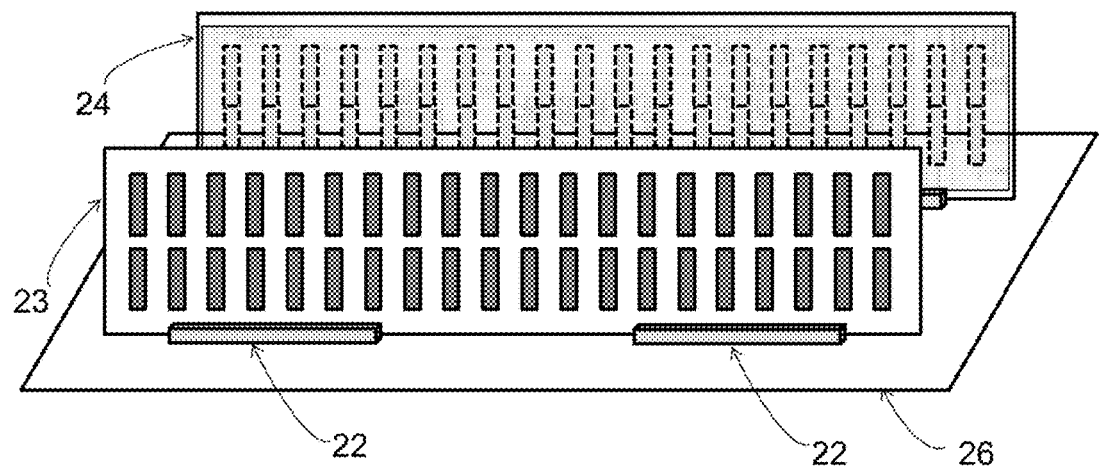
FIG. 12 displays an alternative embodiment of the passive backplane of the TPP.

FIG. 12 displays another passive patch panel implementation option using a separate printed circuit board 26 as a backplane.

This implementation can increase significantly the number of servers in the rack and also provides flexibility in connector/wiring selection.

The printed circuit board 23 supporting the connectors 21 is plugged via high capacity connectors 22 to the backplane 26. The printed circuit board 24 also has high capacity connectors 22 and is also plugged into the backplane 26 to provide connectivity to the connector board 23. The high capacity connectors 21 on the board 24 can be used to interconnect the TPPs rack 33 to rack 33.

The direct interconnect wiring is implemented on the backplane 26. Any time the wiring changes (for different reasons) the only device to change is the backplane 26. For example, where a very large torus implementation needs to change (e.g. for a 10,000 server configuration the most efficient 4D torus would be a 10×10×10×10 configuration as opposed to trying to use a 6×7×16×15; and for a 160,000 server deployment the most efficient configuration would be a 20×20×20×20), you can accommodate these configurations by simply changing the backplane 26 while maintaining the connector boards 23 and 24 the same.

Figure 13:
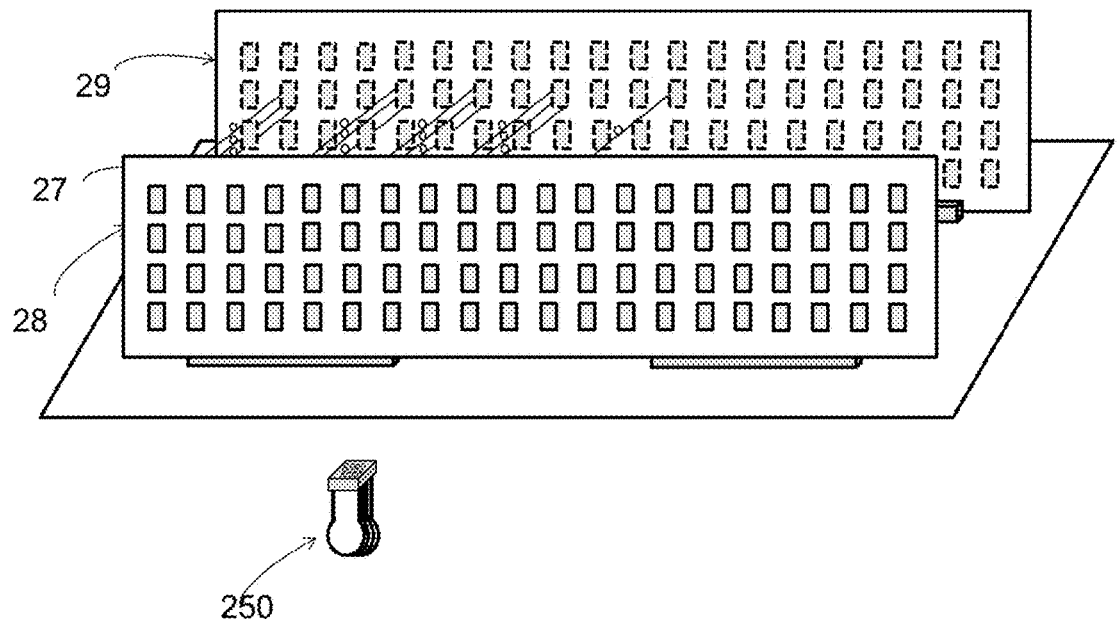
FIG. 13 displays a high level view of an optical TPP implementation of the present invention.

FIG. 13 displays an optical patch panel implementation. Such implementation assumes port to port fiber interconnect as per the wiring diagram presented in FIG. 5 or 6 (2D or 3D torus). The optical connectors on boards 28 and 29 are interconnected using optical fiber 27 (e.g. high density FlexPlane optical circuitry from Molex, which provides high density optical routing on PCBs or backplanes). The optical TPP is preferably fibered at manufacturing time and the optical plugs 250 should populate the TPP during manufacturing. The connectors and the optical plugs 250 are preferably low loss. The connector's optical loss is determined by the connector type (e.g. whether or not it uses micro optical lenses for collimation) and the wavelength (e.g. single mod fiber in C band introduces lower optical loss than multimode fiber at 1340 nm).

Figure 18:
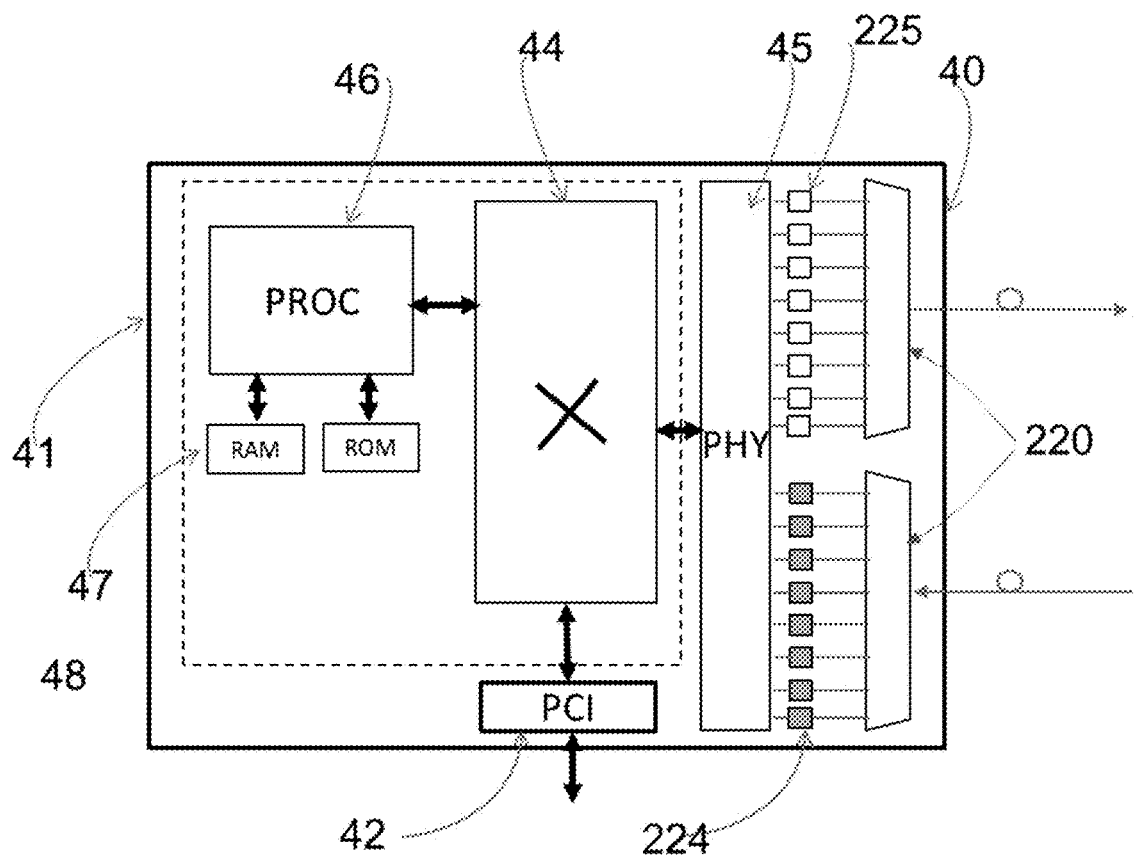
FIG. 18 displays a block diagram of a PCIe card with optical multiwavelengths in accordance with the present invention.
Figure 19:
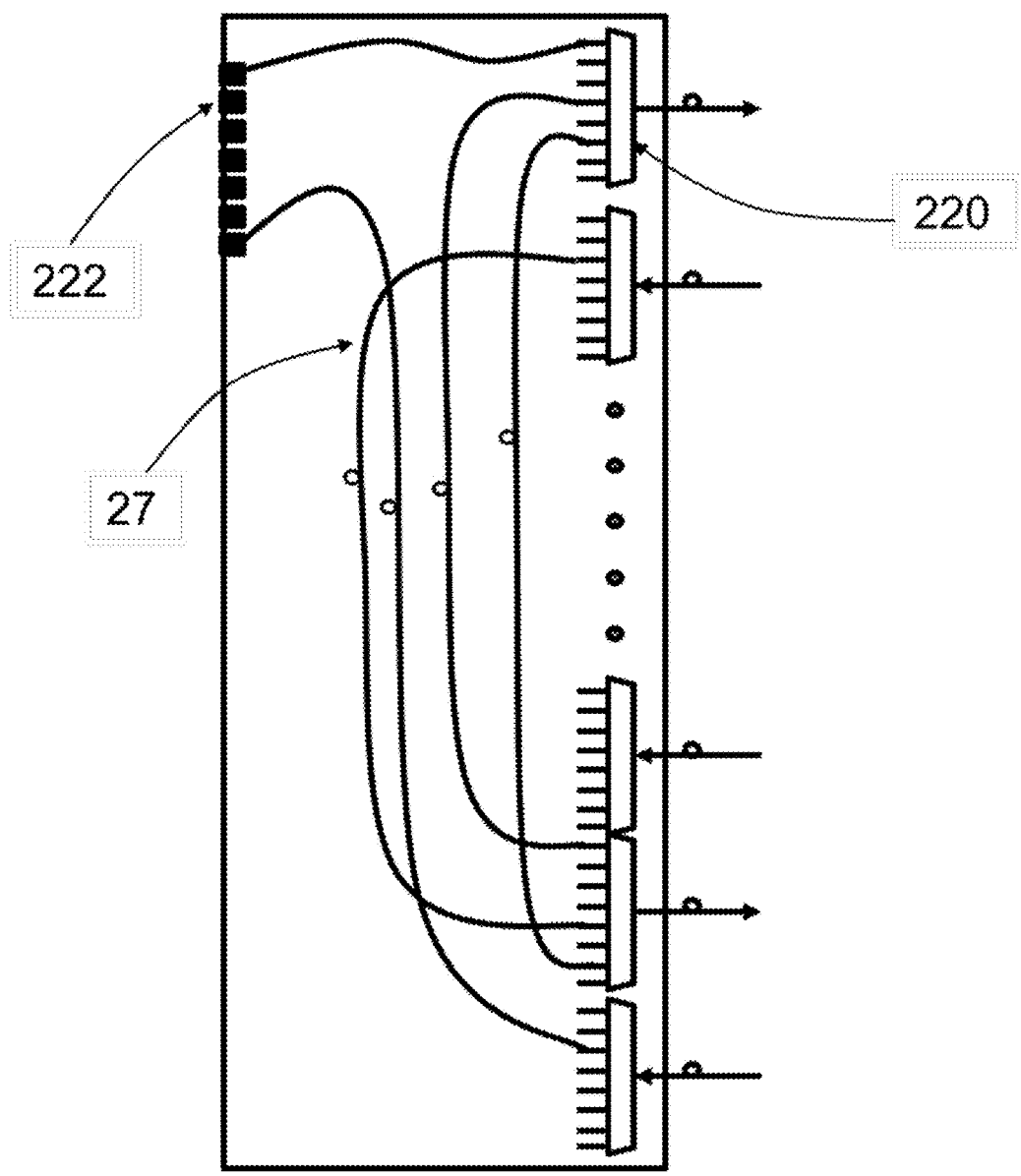
FIG. 19 displays a high level view of a TPP having a passive optical multiwavelengths implementation of the present invention.
Figure 21:
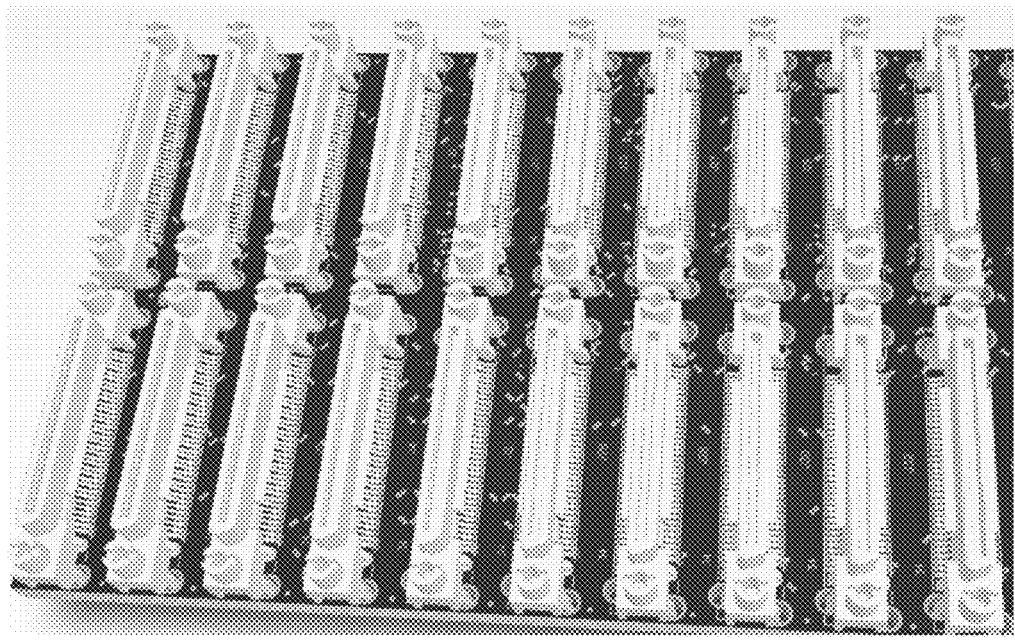
FIG. 21 displays the connectors installed on the TPP.
Figure 22:
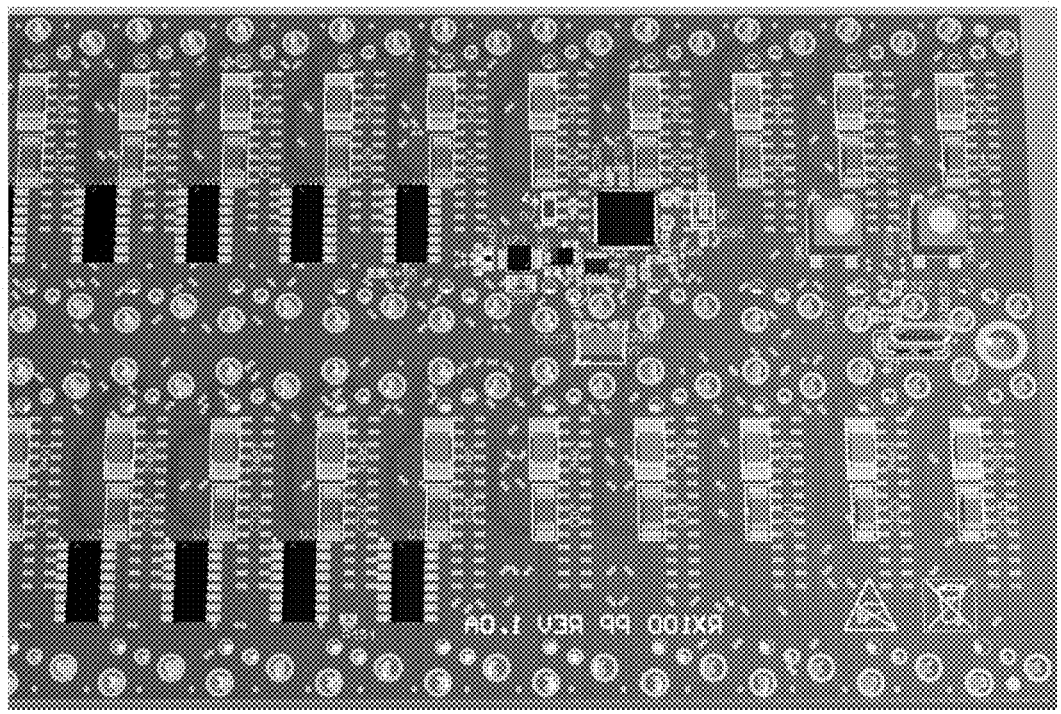
FIG. 22 is the rear view of the connector board of the TPP with unpowered integrated circuits used to identify connector ID and patch panel ID.

Another implementation option for the optical TPP is presented in FIG. 19. This implementation drastically reduces the number of physical connections (fibers) using optical wavelength multiplexing. The new component added to the TPP is the passive optical mux-demux 220 that combines multiple optical wavelengths on the same fiber. The fibers 27 interconnects the outputs of the mux-demux 220 to implement the optical direct interconnect torus structure. To connect two different racks (TPP to TPP), connector 222 is used. This implementation requires a modified version of the PCIe card 41 as shown in FIG. 18. The card 41 includes the optical mux-demux 220, optical transmitters 225 on different wavelengths, and optical receivers 224.

The TPP can also be deployed as an electrical/optical hybrid implementation. In such a case, the torus nodes would have optical ports and electrical ports. A hybrid implementation would usually be used to provide connectivity to very large data centers. You could use the electrical connectivity at the rack level and optical connectivity in all rack to rack or geographical distributed data center interconnects. The electrical cables are frequently used for low rate connectivity (e.g. 1 Gbps or lower rate 10/100 Mbps). Special electrical cables can be used at higher rate connectivity (e.g. 10 Gbps). The higher rate interconnect network may use optical transmission, as it can offer longer reach and can support very high rates (e.g. 100 Gbps or 400 Gbps).

Figure 15:
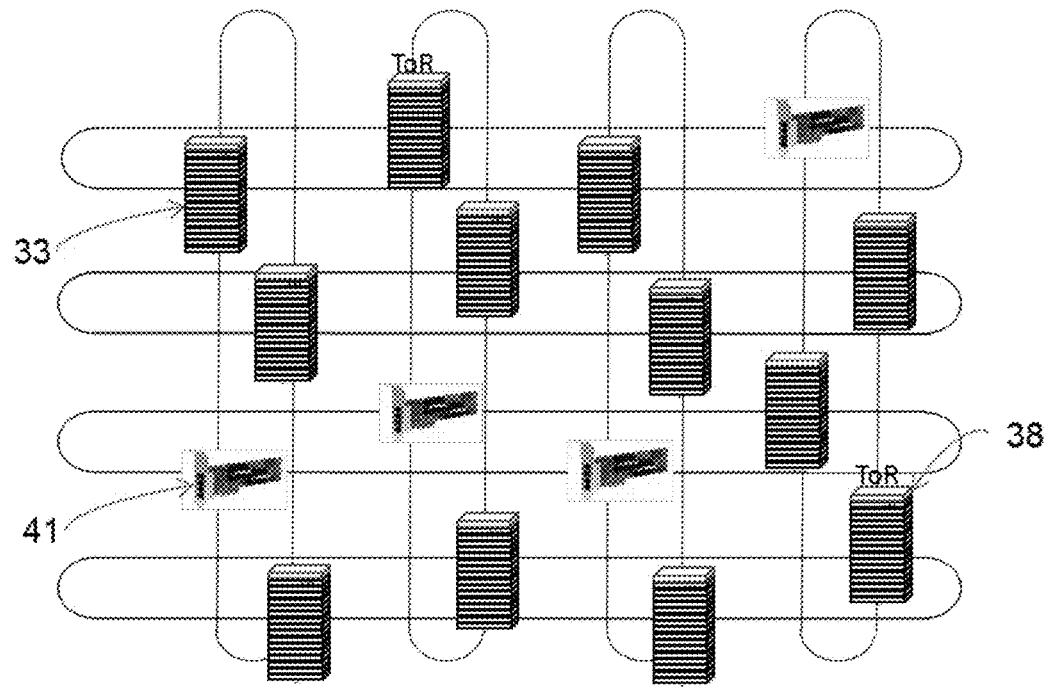
FIG. 15 displays a high level view of a hybrid implementation of a torus toplogy with nodes implemented by Top of the Rack switches and PCIe cards housed in the server.

FIG. 15 shows a combined deployment using a Top of the Rack (ToR) switch 38 and a PCIe card 41 based server interconnect in a torus structure that is suited to implement hybrid compute servers and storage server configurations. The PCIe 41 based implementation has the advantage of increased add/drop bandwidth since the PCI port in a server can accommodate substantially more bandwidth than a fixed switch port bandwidth (e.g. 1 Gbps or 10 Gbps). The PCIe card 41 supporting the 4D torus implementation can accommodate up to 8 times the interconnect bandwidth of the torus links.

The ToR switch 38 is an ordinary layer 2 Ethernet switch. The switch provides connectivity to the servers and connectivity to other ToR switches in a torus configuration where the ToR switch is a torus node. According to this embodiment of the invention the ToR switches 38 and the PCIe cards 41 are interconnected further using a modified version of the TPP 31.

Figure 16:
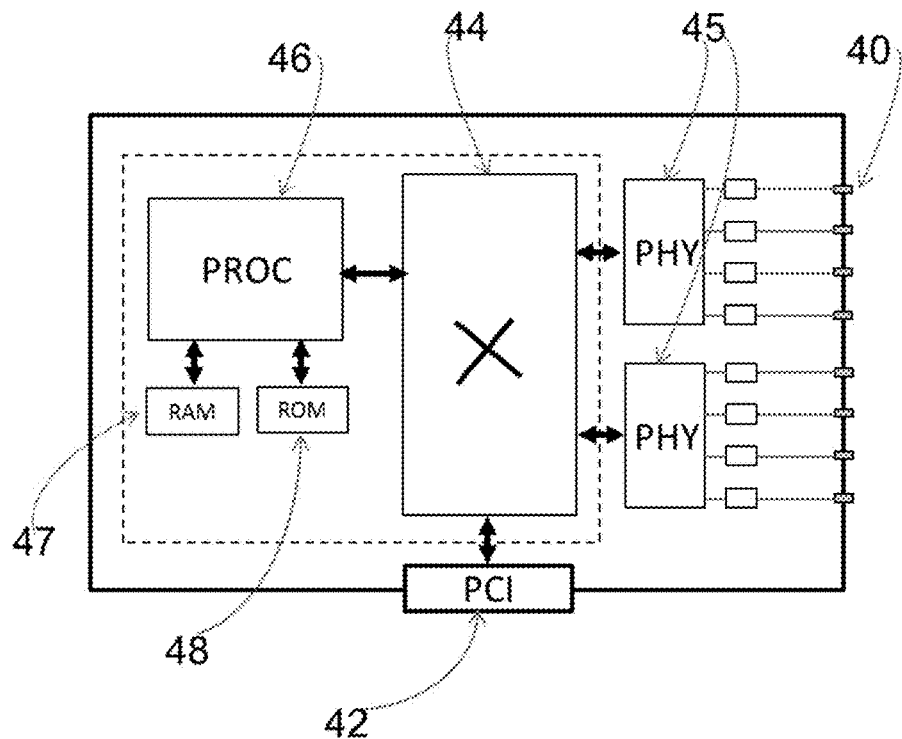
FIG. 16 displays a block diagram of a PCIe card implementation in accordance with the present invention.

FIG. 16 displays the block diagram of the PCIe card implementation for the present invention. This card can be seen as a multiport Network Interface Card (NIC). The PCIe card 41 includes a processor 46 with RAM 47 and ROM 48 memory, a packet switch 44 and the Ethernet PHY interface devices 45. The card 41 as shown has a PCIe connection 42 and 8 interface ports 40, meaning the card as shown can provide for the implementation of up to a four dimension torus direct interconnect network.

Figure 17:
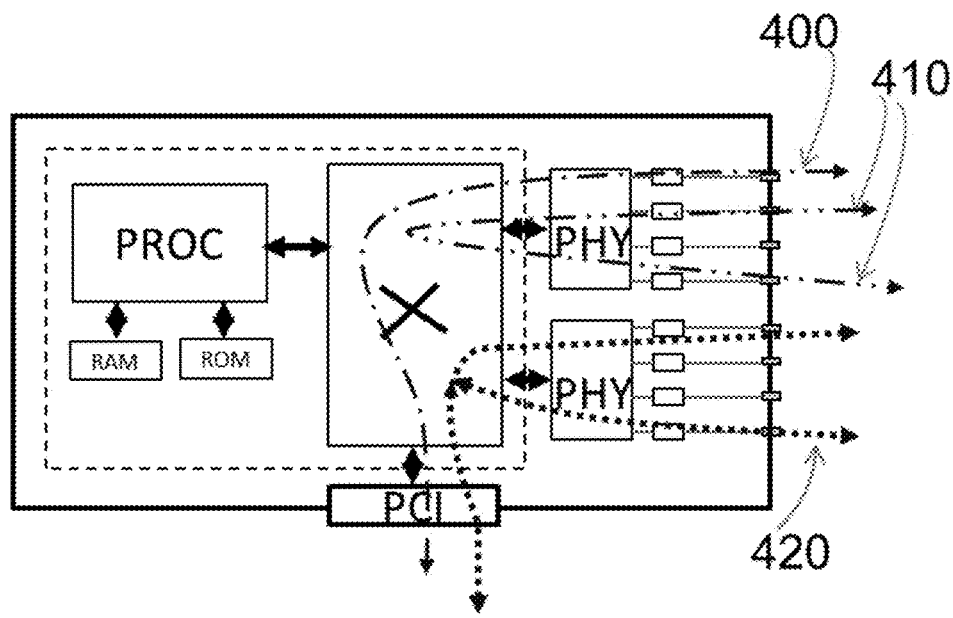
FIG. 17 displays the packet traffic flow supported by the PCIe card shown in FIG. 16.

FIG. 17 displays the packet traffic flows supported by the card 41. Each port 40 has access to the PCI port 42. Therefore, in the case of port to PCI traffic (as shown by 400), the total bandwidth is eight times the port capacity given that the total number of ports 40 is 8. The number of ports determines the torus mesh connectivity. An eight port PCIe Card implementation enables up to a four dimension torus (x+, x−, y+, y−, z+, z− and w+, w−).

A second type of traffic supported by the card 41 is the hair pinning traffic (as shown by 410). This occurs where traffic is switched from one port to another port; the traffic is simply transiting the node. A third type of traffic supported by the card 41 is transit with add/drop traffic (as shown at 420). This occurs when incoming traffic from one port is partially dropped to the PCI port and partially redirected to another port, or where the incoming traffic is merged with the traffic from the PCI port and redirected to another port.

The transit and add/drop traffic capability implements the direct interconnect network, whereby each node can be a traffic add/drop node.

I claim:

1. A passive patch panel for use in the implementation of a torus or higher radix interconnect, comprising:
   a passive printed circuit board that houses node to node connectivity for the torus or higher radix interconnect; and
   at least one connector board plugged into the passive printed circuit board comprising multiple connectors, wherein said multiple connectors comprise fields of multiple connectors, namely:
      a main field of connectors for implementing a 2D torus interconnect network;
      a second field of connectors to allow for expansion of the network to a 3D torus interconnect network;
      and a third field of connectors to allow for expansion of the network to a 4D torus interconnect network; and
      wherein each of said connectors is initially populated by an interconnecting plug to initially close one or more connections of the torus or higher radix interconnect, and wherein each of said plugs is capable of being replaced by a cable attached to a Peripheral Component Interconnect Express (PCIe) card from a server to build an interconnect network.

2. The passive patch panel of claim 1 wherein the main field comprises 42 connectors in a 7×6 torus configuration, the second field comprises 12 connectors in 2 groups of 6, and the third field comprises 12 connectors in 2 groups of 6.

3. The passive patch panel of claim 1 wherein the printed circuit board includes unpowered electronic devices using a passive resistor combination attached to every connector, and wherein when a plug populating a connector is replaced by a cable attached to a Peripheral Component Interconnect Express (PCIe) card the device attached to the connector is interrogated by software running on the PCIe card in order to obtain an ID of the connector.

4. A passive patch panel for use in the implementation of a torus or higher radix interconnect, comprising:
   a passive printed circuit board that houses node to node connectivity for the torus or higher radix interconnect; and
   at least one connector board plugged into the passive printed circuit board comprising multiple connectors, wherein said multiple connectors comprise fields of multiple connectors, namely:

a main field of connectors for implementing a torus interconnect network in N dimensions;

a second field of connectors for expanding the network to a N+1 dimension torus interconnect network; and a third field of connectors for expanding the network to a N+2 dimension torus interconnect network; and wherein N is at least 3;

and wherein each of said connectors is initially populated by an interconnecting plug to initially close one or more connections of the torus or higher radix interconnect, and wherein each of said plugs is capable of being replaced by a cable attached to a Peripheral Component Interconnect Express (PCIe) card from a server to build an interconnect network.

5. The passive patch panel of claim 4 wherein the printed circuit board includes unpowered electronic devices using a passive resistor combination attached to every connector, and wherein when a plug populating a connector is replaced by a cable attached to a Peripheral Component Interconnect Express (PCIe) card the device attached to the connector is interrogated by software running on the PCIe card in order to obtain an ID of the connector.

6. The passive patch panel of claim 1 wherein the at least one connector board plugged into the passive printed circuit board with multiple connectors is used to increase a number of servers that may be used in a rack, wherein the printed circuit board is plugged via high capacity connectors to a backplane to provide connectivity to the connector board, and wherein high capacity connectors on the board may be used to patch panels rack to rack.

7. A method for reducing deployment complexity and promoting wiring simplification when adding new servers in a direct interconnect network without impacting an existing implementation of the network comprising the steps of:

populating connectors interconnected in a passive printed circuit board housed by a passive patch panel with interconnect plugs that initially close one or more connections of the network, said connectors comprising:

a main field of connectors for implementing a 2D torus interconnect network;

a second field of connectors for expanding the network to a 3D torus interconnect network; and a third field of connectors for expanding the network to a 4D torus interconnect network;

replacing each of said interconnect plugs with a connecting cable attached to a Peripheral Component Interconnect Express (PCIe) card housed in a server to add said server to the interconnect network;

discovering connectivity of the server to the interconnect network; and discovering topology of the interconnect network based on the server added to the interconnect network.

8. The method of claim 7 wherein the main field comprises 42 connectors in a 7×6 torus configuration, the second field comprises 12 connectors in 2 groups of 6, and the third field comprises 12 connectors in 2 groups of 6.

9. A method for reducing deployment complexity and promoting wiring simplification when adding new servers in a direct interconnect network without impacting an existing implementation of the network comprising the steps of:

populating connectors interconnected in a passive printed circuit board housed by a passive patch panel with interconnect plugs that initially close one or more connections of the network, said connectors comprising:

a main field of connectors for implementing a torus interconnect network in N dimensions;

a second field of connectors for expanding the network to a N+1 dimension torus interconnect network; and a third field of connectors for expanding the network to a N+2 dimension torus interconnect network; and wherein N is at least 3, replacing each of said interconnect plugs with a connecting cable attached to a Peripheral Component Interconnect Express (PCIe) card housed in a server to add said server to the interconnect network;

discovering connectivity of the server to the interconnect network; and discovering topology of the interconnect network based on the server added to the interconnect network.

* * * * *